US007347094B2

(12) United States Patent
Geen et al.

(10) Patent No.: US 7,347,094 B2
(45) Date of Patent: Mar. 25, 2008

(54) COUPLING APPARATUS FOR INERTIAL SENSORS

(75) Inventors: John A. Geen, Tewksbury, MA (US); William A. Clark, Fremont, CA (US); Jinbo Kuang, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 329 days.

(21) Appl. No.: 11/106,354

(22) Filed: Apr. 14, 2005

(65) Prior Publication Data

US 2005/0229703 A1 Oct. 20, 2005

Related U.S. Application Data

(60) Provisional application No. 60/561,931, filed on Apr. 14, 2004.

(51) Int. Cl.
*G01P 9/04* (2006.01)

(52) U.S. Cl. ................................ 73/504.12; 73/504.14

(58) Field of Classification Search ............. 73/504.02, 73/504.04, 504.12, 504.13, 504.14, 504.15, 73/504.16, 510, 514.32, 514.29, 514.38, 73/862.59
See application file for complete search history.

(56) References Cited

U.S. PATENT DOCUMENTS

| | | | | |
|---|---|---|---|---|
| 2,309,853 | A | 2/1943 | Lyman et al. | |
| 4,381,672 | A | 5/1983 | O'Connor et al. | 73/505 |
| 4,510,802 | A | 4/1985 | Peters | 73/505 |
| 4,524,619 | A | 6/1985 | Staudte | 73/505 |
| 4,598,585 | A | 7/1986 | Boxenhorn | 73/505 |
| 4,654,663 | A | 3/1987 | Alsenz et al. | 73/517 |
| 4,744,248 | A | 5/1988 | Stewart | 73/505 |
| 4,744,249 | A | 5/1988 | Stewart | 73/505 |
| 4,884,446 | A | 12/1989 | Ljung | 73/505 |
| 5,016,072 | A | 5/1991 | Greiff | 357/26 |
| 5,016,076 | A | 5/1991 | Darwish | 357/38 |
| 5,025,346 | A | 6/1991 | Tang et al. | 361/283 |
| 5,056,366 | A | 10/1991 | Fersht et al. | 73/505 |

(Continued)

FOREIGN PATENT DOCUMENTS

WO WO 93/05401 3/1993

(Continued)

OTHER PUBLICATIONS

Weinberg et al., *A Micromachined Comb-Drive Tuning Fork Rate Gyroscope*, Proceedings of the 49th Annual Meeting of the Institute of Navigation, Jun. 21-23, 1993, 7 pages.

(Continued)

*Primary Examiner*—Helen Kwok
(74) *Attorney, Agent, or Firm*—Bromberg & Sunstein LLP

(57) ABSTRACT

A coupling apparatus allows anti-phase movements of inertial sensor element frames along parallel axes but substantially prevents in-phase movements of the frames. The coupling apparatus includes a bar coupled between first and second sensor element frames and at least one supporting structure supporting the bar. The at least one structure is coupled to a substrate underlying the frames. The structures allow the bar to rotate at a pivot point when the frames move in anti-phase to one another along substantially parallel axes but substantially prevent in-phase movements of the frames.

16 Claims, 5 Drawing Sheets

U.S. PATENT DOCUMENTS 5,111,693 A 5/1992 Greiff .......................... 73/514
5,144,184 A 9/1992 Greiff ......................... 310/312
5,195,371 A 3/1993 Greiff .......................... 73/505
5,203,208 A 4/1993 Bernstein ..................... 73/505
5,216,490 A 6/1993 Greiff et al. .................. 73/517
5,241,861 A 9/1993 Hulsing, II .................. 73/505
5,259,247 A 11/1993 Bantien ....................... 73/718
5,273,939 A 12/1993 Becker et al. .............. 437/209
5,313,835 A 5/1994 Dunn .......................... 73/505
5,329,815 A 7/1994 Dunn et al. ................... 73/505
5,341,682 A 8/1994 Hulsing, II .................. 73/505
5,343,749 A 9/1994 Macy .......................... 73/505
5,349,855 A 9/1994 Bernstein et al. ............ 73/505
5,359,893 A 11/1994 Dunn .......................... 73/505
5,367,217 A 11/1994 Norling ...................... 310/370
5,377,544 A 1/1995 Dunn .......................... 73/505
5,392,650 A 2/1995 O'Brien et al. ............... 73/517
5,408,877 A 4/1995 Greiff et al. .................. 73/505
5,481,914 A 1/1996 Ward ....................... 73/504.16
5,492,596 A 2/1996 Cho ........................ 156/632.1
5,496,436 A 3/1996 Bernstein et al. ........ 156/628.1
5,505,084 A 4/1996 Greiff et al. ............. 73/504.14
5,511,419 A 4/1996 Dunn ...................... 73/504.08
5,515,724 A 5/1996 Greiff et al. ............. 73/504.12
5,530,342 A 6/1996 Murphy ................... 324/158.1
5,535,902 A 7/1996 Greiff ............................ 216/2
5,537,872 A 7/1996 Frere et al. .............. 73/504.12
5,555,765 A 9/1996 Greiff ...................... 73/504.09
5,574,222 A 11/1996 Offenberg ................ 73/514.32
5,581,035 A 12/1996 Greiff ...................... 73/514.32
5,600,064 A 2/1997 Ward ....................... 73/504.04
5,600,065 A 2/1997 Kar et al. ................ 73/504.12
5,604,309 A 2/1997 Ward ....................... 73/504.02
5,604,312 A 2/1997 Lutz ........................ 73/504.14
5,608,351 A 3/1997 Ward .......................... 330/107
5,635,638 A 6/1997 Geen ....................... 73/504.04
5,635,639 A 6/1997 Greiff et al. ............. 73/504.04
5,635,640 A 6/1997 Geen ....................... 73/504.12
5,646,348 A 7/1997 Greiff et al. ............. 73/514.36
5,650,568 A 7/1997 Greiff et al. ............. 73/504.09
5,672,949 A 9/1997 Ward .......................... 318/609
5,696,323 A 12/1997 Hulsing, II .............. 73/504.12
5,717,140 A 2/1998 Hulsing, II .............. 73/504.16
5,734,105 A 3/1998 Mizukoshi ............... 73/504.02
5,747,961 A 5/1998 Ward et al. ................. 318/646
5,763,781 A 6/1998 Netzer ..................... 73/504.16
5,767,405 A 6/1998 Bernstein et al. ........ 73/504.16
5,783,973 A 7/1998 Weinberg et al. ............. 331/35
5,795,988 A 8/1998 Lo et al. ....................... 73/1.77
5,796,001 A 8/1998 Greiff et al. ............. 73/504.16
5,869,760 A 2/1999 Geen ....................... 73/504.12
5,886,816 A 3/1999 Faris .......................... 359/464
5,892,153 A 4/1999 Weinberg et al. ........ 73/504.16
5,895,850 A 4/1999 Buestgens ................ 73/504.12
5,895,851 A 4/1999 Kano et al. .............. 73/504.04
5,911,156 A 6/1999 Ward et al. .............. 73/504.16
5,918,280 A 6/1999 Gang et al. .............. 73/504.12
5,920,012 A 7/1999 Pinson .................... 73/504.12
5,945,600 A 8/1999 Touge et al. ............. 73/504.14
5,952,572 A 9/1999 Yamashita et al. ....... 73/504.04
5,955,668 A 9/1999 Hsu et al. ................ 73/504.12
5,987,986 A 11/1999 Wyse et al. .............. 73/504.12
5,992,233 A 11/1999 Clark ...................... 73/514.35
6,009,751 A 1/2000 Ljung ...................... 73/504.02
6,032,531 A 3/2000 Roszhart .................. 73/504.04
6,044,707 A 4/2000 Kato ....................... 73/504.14
6,064,169 A 5/2000 Ward et al. ................. 318/646
6,067,858 A 5/2000 Clark et al. .............. 73/504.16
6,070,463 A 6/2000 Moriya et al. ........... 73/504.12
6,070,464 A 6/2000 Koury, Jr. et al. ....... 73/514.32
6,089,089 A 7/2000 Hsu ........................ 73/504.12
6,122,961 A 9/2000 Geen et al. .............. 73/504.12
6,128,953 A 10/2000 Mizukoshi ............... 73/504.02
6,155,115 A 12/2000 Ljung ...................... 73/504.12
6,164,134 A 12/2000 Cargille ................... 73/504.02
6,189,381 B1 2/2001 Huang et al. ............ 73/504.12
6,190,571 B1 2/2001 Kato ............................. 216/2
6,230,563 B1 5/2001 Clark et al. .............. 73/504.04
6,250,156 B1 6/2001 Seshia et al. ............ 73/502.12
6,250,157 B1 6/2001 Touge ..................... 73/504.12
6,257,059 B1 7/2001 Weinberg et al. ........ 73/504.16
6,282,960 B1 9/2001 Samuels et al. ......... 73/514.32
6,289,733 B1 9/2001 Challoner et al. ....... 73/504.12
6,311,555 B1 11/2001 McCall et al. ................ 73/488
6,321,598 B1 11/2001 Iwaki et al. ............. 73/504.02
6,505,511 B1 1/2003 Geen et al. .............. 73/504.12
6,516,666 B1 2/2003 Li ........................... 73/504.12
6,561,029 B2 5/2003 Folkmer et al. ......... 73/504.14
6,767,758 B1 7/2004 Geen ........................... 438/48
6,860,151 B2 3/2005 Flatt et al. ............... 73/504.16
2003/0005767 A1 1/2003 Hulsing, II .............. 73/514.02
2003/0131664 A1 7/2003 Mochida et al. ......... 73/504.12
2003/0131669 A1 7/2003 Osawa .................. 73/861.355

FOREIGN PATENT DOCUMENTS

WO WO 96/39615 12/1996
WO WO 01/79862 A1 10/2001

OTHER PUBLICATIONS

Seshia et al., *Integrated Microelectromechanical Resonant Output Gyroscope*, updated, online <http://hera.berkeley.edu/IRO/Summary/olabstracts/ aseshia.1.html>, printed Feb. 6, 2002, 2 pages.

Geen et al., *Single-Chip Surface Micromachined Integrated Gyroscope with 50°/h Allan Deviation*, IEEE Journal of Solid-State Circuits, vol. 37, No. 12, Dec. 2002, 7 pages.

*A Comb-drive Piezoresistive Vibratory Gyroscope*, online <http://mems.stanford.edu/~lian/gyro.html>, printed Feb. 6, 2002, 4 pages.

Authorized Officer Gregory Adam, *The International Search Report and The Written Opinion of the International Searching Authority*, International Searching Authority, Aug. 3, 2005, 10 pages.

COUPLING APPARATUS FOR INERTIAL SENSORS

CROSS-REFERENCE TO RELATED APPLICATIONS

This application claims priority from U.S. Provisional Patent Application No. 60/561,931 entitled Inertial Sensor Array and Coupling Apparatus for the Same, filed on Apr. 14, 2004 in the names of John A. Geen, William A. Clark, and Jinbo Kuang, which is hereby incorporated herein by reference in its entirety.

This application is also related to a certain U.S. patent application entitled INERTIAL SENSOR WITH A LINEAR ARRAY OF SENSOR ELEMENTS filed on even date herewith, which claims priority from the above-referenced provisional patent application and is hereby incorporated by reference in its entirety.

FIELD OF THE INVENTION

The invention generally relates to sensors and, more particularly, the invention relates to inertial sensors.

BACKGROUND OF THE INVENTION

Inertial sensors, such as MEMS gyroscopes, often are adversely affected by rotational vibration noise at the drive frequency (often referred to as "wobble"). In particular, MEMS gyroscopes can produce false readings if they are not capable of distinguishing between rotational vibration and the actual movement they are intended to detect.

Also, distortion of the geometry of a MEMS device having an oscillating mass, such as a gyroscope, can produce an imbalance in the forces transverse to a longitudinal drive finger. This imbalance can cause a net force that is indistinguishable from a Coriolis force. Consequently, a gyroscope can produce false outputs. There are at least two sources of these geometric distortions. One arises from surface shear of the substrate (e.g., from release/wafer curvature on dicing). Another arises from differential expansion of the package and applied accelerations (e.g., diagonally, G×G). Some causes of G×G error is discussed in Geen, J. A., "Progress in Integrated Gyroscopes," IEEE PLANS 2004 Proceedings, pp. 1-6, which is hereby incorporated herein by reference in its entirety.

SUMMARY OF THE INVENTION

Embodiments of the present invention provide apparatus for coupling inertial sensor element frames so as to allow anti-phase movements of the inertial sensor element frames along parallel axes but substantially prevents in-phase movements of the frames.

In accordance with one aspect of the invention there is provided apparatus for coupling sensor elements of an inertial sensor. The apparatus includes a bar coupled between first and second sensor element frames and at least one supporting structure supporting the bar. The at least one structure is coupled to a substrate underlying the frames. The structures allow the bar to rotate at a pivot point when the frames move in anti-phase to one another along substantially parallel axes but substantially prevent in-phase movements of the frames.

In one exemplary embodiment, the apparatus further includes a first pair of short flexures extending from one of the frames and interconnected by a first long flexure and a second pair of short flexures extending from the other of the frames and interconnected by a second long flexure. The bar interconnects the first long flexure to the second long flexure substantially at the midpoints of the first and second long flexures. The at least one supporting structure includes an anchor flexure supporting the bar. The anchor flexure intersects with the bar substantially at the midpoints of the bar and the anchor flexure. Each end of the anchor flexure anchored to the substrate. Each of the long flexures is typically coupled so as to flex as the bar rotates.

In another exemplary embodiment of the invention, the apparatus further includes a first flexure extending from one of the frames and a second flexure extending from the other of the frames. The bar interconnects the first and second flexures. The at least one supporting structure includes at least one anchor flexure supporting the bar. Each anchor flexure includes a structure anchored at one end to the at least one substrate and folded back 180 degrees to meet with the bar. The at least one anchor flexure may include four anchor flexures positioned around the pivot point. Each of the anchor flexures is typically anchored to the substrate adjacent to the bar. Each of the first and second flexures may include two substantially parallel members coupled at both ends, with one of the members coupled to the frame and the other member coupled to the bar such that the members flex as the bar rotates.

In accordance with another aspect of the invention there is provided apparatus for coupling sensor elements of an inertial sensor. The apparatus includes coupling means for coupling first and second sensor element frames and supporting means for supporting the coupling means. The supporting means are coupled to a substrate underlying the frames. The supporting means allow the coupling means to rotate at a pivot point when the frames move in anti-phase to one another along substantially parallel axes but substantially preventing in-phase movements of the frames.

In a first exemplary embodiment, the coupling means include a first pair of short flexures extending from one of the frames and interconnected by a first long flexure; a second pair of short flexures extending from the other of the frames and interconnected by a second long flexure; and a bar that interconnects the first long flexure to the second long flexure substantially at the midpoints of the first and second long flexures. The supporting means may include an anchor flexure supporting the bar, the anchor flexure intersecting with the bar substantially at the midpoints of the bar and the anchor flexure, each end of the anchor flexure anchored to the substrate. Each of the long flexures may be coupled so as to flex as the bar rotates.

In another exemplary embodiment of the invention, the coupling means include a first flexure extending from one of the frames; a second flexure extending from the other of the frames; and a bar that interconnects the first and second flexures. The supporting means may include at least one anchor flexure supporting the bar, each anchor flexure including a structure anchored at one end to the at least one substrate and folded back 180 degrees to meet with the bar. The at least one anchor flexure may include four anchor flexures positioned around the pivot point. Each of the anchor flexures may be anchored to the substrate adjacent to the bar. Each of the first and second flexures may include two substantially parallel members coupled at both ends, one of the members coupled to the frame, the other member coupled to the bar, the members coupled so as to flex as the bar rotates.

In typical embodiments of the invention, rotation of the substrate about an axis normal to the plane causes the movements of the frames.

BRIEF DESCRIPTION OF THE DRAWINGS

The foregoing and advantages of the invention will be appreciated more fully from the following further description thereof with reference to the accompanying drawings wherein.

The drawings are for illustrative purposes and may not be drawn to scale.

DETAILED DESCRIPTION OF A PREFERRED EMBODIMENT

In illustrative embodiments, an inertial sensor has a plurality of individual sensor components that all share a common centroid. Details of illustrative embodiments are discussed below.

Figure 1:
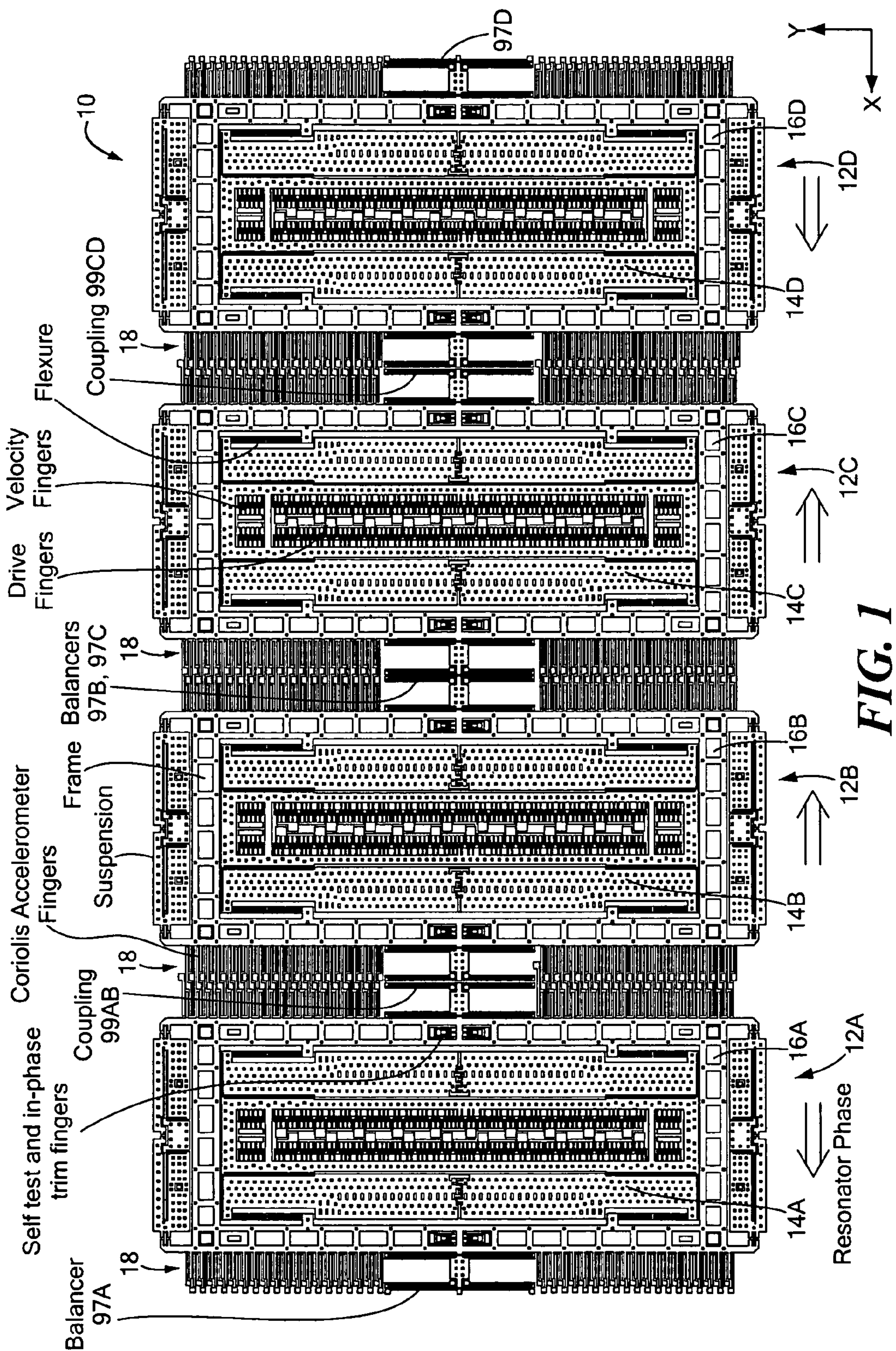
FIG. 1 schematically shows a linear array of gyroscopes configured in accordance with illustrative embodiments of the invention.

FIG. 1 schematically shows an array 10 of microelectromechanical systems (i.e., "MEMS") configured in accordance with illustrative embodiments of the invention. Specifically, the array 10 of MEMS devices together combine to effectively perform the function of a single gyroscope. To that end, the array 10 includes four MEMS gyroscopes 12A-D that all are secured to a common underlying substrate (not shown). Alternatively, the MEMS gyroscopes 12A-12D could be secured to different substrates.

Each gyroscope 12A-12D includes at least one oscillating mass (referred to herein as "resonator 14A, 14B, 14C, and 14D," respectively, or "resonator 14" generally) that 1) oscillates at a constant frequency along the X-axis and 2) is coupled with a single accelerometer frame (referred to herein as "frame 16A, 16B, 16C, or 16D," respectively, or "frame 16" generally). The resonator 14 illustratively is compliant in the X-direction only, while the frame 16 is compliant in the Y-direction only. Accordingly, rotation of any one of the gyroscopes 12A-12D about the Z-axis causes its resonator 14 to produce a Coriolis force that imparted to the accelerometer frame 16. Upon receipt of this Coriolis force, the frame 16 moves along the Y-axis. Capacitively coupled fingers 18 detect this Y-movement, which is translated into a signal representing the magnitude of the angular acceleration.

In illustrative embodiments, the gyroscopes 12A-12D are similar to those disclosed in U.S. Pat. Nos. 6,505,511 and 6,122,961, the disclosures of which are incorporated herein, in their entireties, by reference. The gyroscopes 12A-12D also may be similar to those disclosed in U.S. Pat. No. 6,877,374, the disclosure of which also is incorporated herein, in its entirety, by reference.

As noted above, in illustrative embodiments, the different gyroscopes 12A and 12D have a common centroid with the gyroscopes producing anti-phase signals 12B and 12C. The array 10 therefore is configured to position the gyroscopes 12A-12D and phase the respective resonators 14 in a manner that accomplishes this end. The specific placement, number of gyroscopes 12A-12D, and the phase of their resonators 14 thus are coordinated to ensure that they share a common centroid.

FIG. 1 shows an exemplary arrangement that produces the desired result. In particular, the array 10 includes a first pair of gyroscopes 12A/B having the first and second gyroscopes 12A and 12B, and a second pair of gyroscopes 12 C/D having the third and fourth gyroscopes 12C and 12D. As shown, the resonators 14 in each pair operate 180 degrees out of phase and their frames 16 are coupled together in the manner discussed below. The first pair of gyroscopes 12A/B, however, is not coupled with the second pair 12C/D.

When positioned in the manner shown in FIG. 1, the first gyroscope 12A and the fourth gyroscope 12D resonate in phase, while the second and third gyroscopes 12B and 12C resonate in phase. Accordingly, the following equation is true:

$$V1+V4=V2+V3,$$

where:

- V1 is the vector distance of the first gyroscope 12A to a point of rotation,
- V2 is the vector distance of the second gyroscope 12B to a point of rotation,
- V3 is the vector distance of the third gyroscope 12C to a point of rotation, and
- V4 is the vector distance of the fourth gyroscope 12D to a point of rotation.

Note that a sign of the vector distance should be taken into account when considering this equation. When this relationship holds, the gyroscope as a whole becomes substantially insensitive to angular accelerations about that point of rotation to the extent that the responses of the frames match each other. The couplings overcome the mismatches induced by manufacturing tolerances and thereby improve the rejection of angular acceleration.

This arrangement nevertheless should not adversely affect the array 10 from detecting the underlying angular velocity for which it is designed.

Accordingly, embodiments of the invention should be substantially insensitive surface shear and also, as noted above, cause angular acceleration noise to cancel.

Figure 2:
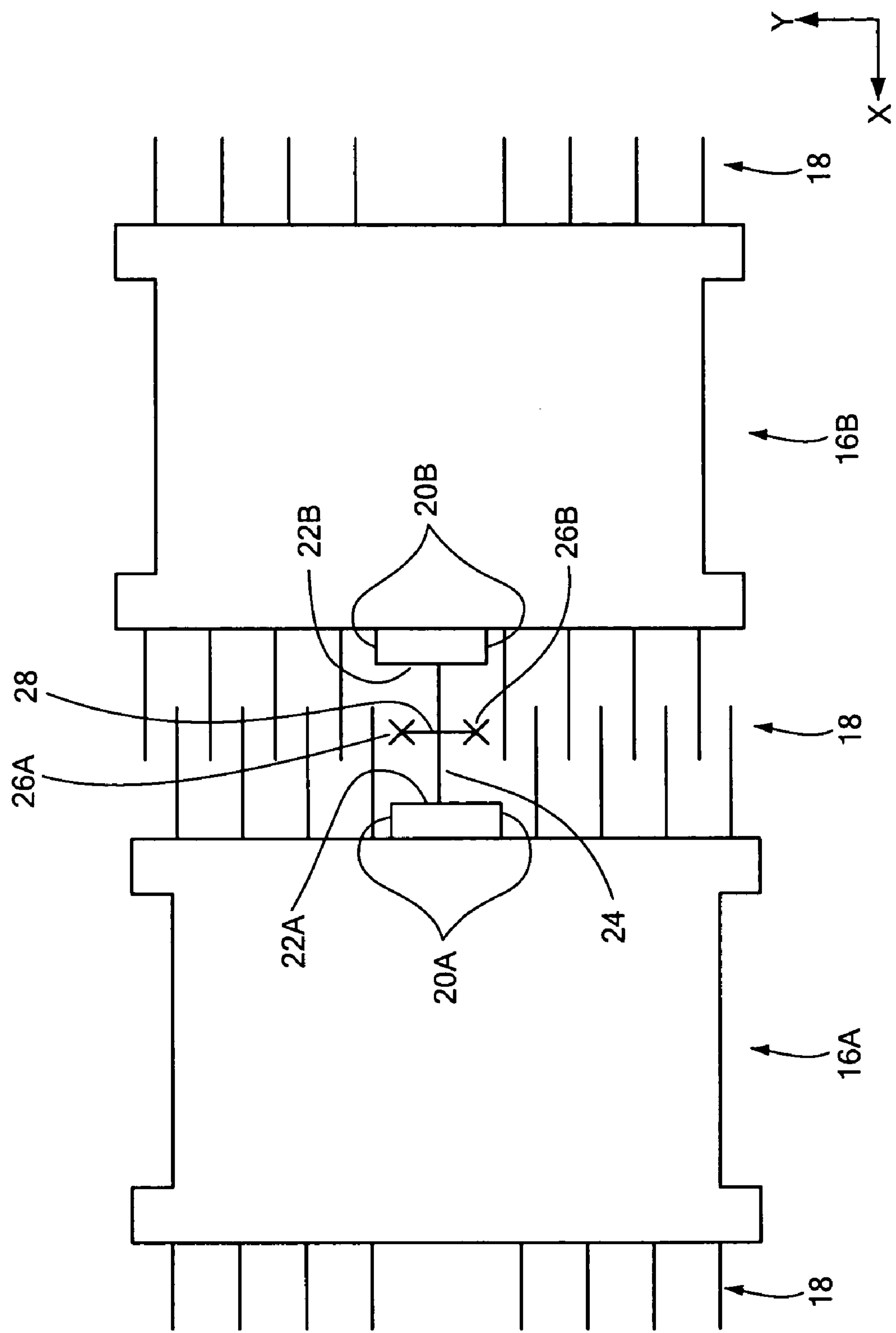
FIG. 2 schematically shows a coupling apparatus for coupling two frames shown in FIG. 1 in accordance with illustrative embodiments of the invention.

As noted above, the individual frames 16 within each pair are coupled in a manner that facilitates operation. Specifically, frames 16A and 16B are coupled by coupling 99AB, while frames 16C and 16D are coupled by coupling 99CD (referred to herein as "coupling apparatus 99" generally). In illustrative embodiments, each pair of frames 16 is coupled to ensure that they can move in anti-phase (i.e., 180 degrees out of phase) only, although the two pairs of frames are not interconnected. FIG. 2 schematically shows more details of a mechanical coupling apparatus 99 for securing two of the frames. Although embodiments of the coupling apparatus 99 apply to any of the frames 16 shown, the frames 16 are identified in FIG. 2 as the first and second frames 16A and 16B for simplicity.

Specifically, the first frame 16A has a first pair of short flexures 20A that are coupled with a first long flexure 22A. In a corresponding manner, the second frame 16B has a second pair of short flexures 20B that are coupled with a second long flexure 22B. A bar 24 secures the first long flexure 22A to the second long flexure 22B. To provide some stability, a pair of anchors 26A and 26B extend on two sides of the bar 24 and couple with it by means of an anchor flexure 28.

This arrangement is substantially noncompliant when the two frames 16A and 16B are urged to move in phase. In contrast, this arrangement is substantially compliant when the two frames 16A and 16B are urged to move in anti-phase. In other words, when the first frame 16A is urged upwardly along the Y-axis, the second frame 16B is urged downwardly along the Y-axis. If both are urged upwardly along the Y-axis, however, this arrangement should be substantially non-compliant. In some embodiments, this arrangement permits the frames 16A and 16B to rotate to some extent as they move in the Y-direction.

Figure 3:
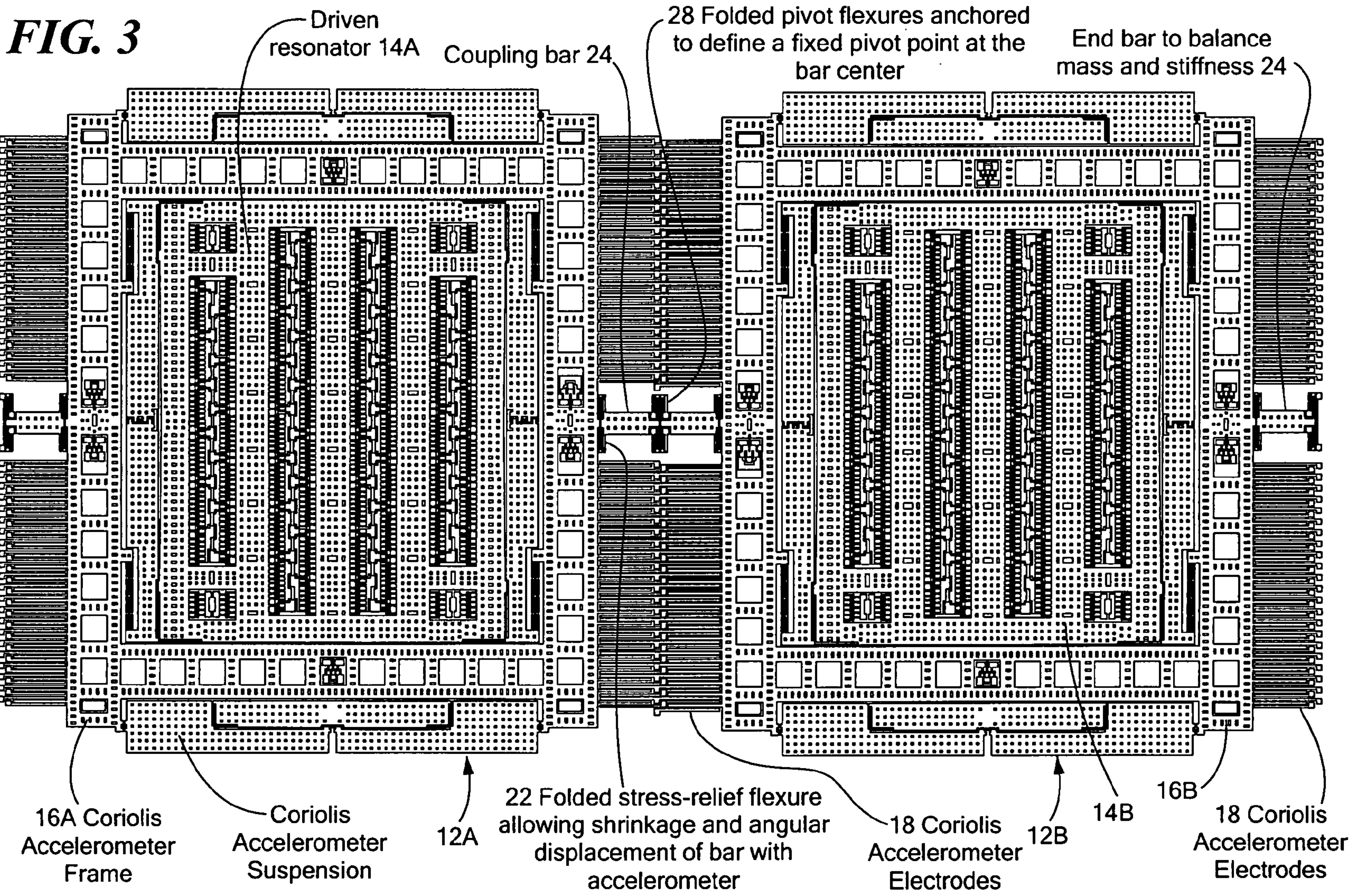
FIG. 3 schematically shows additional details of an alternative embodiment of a first pair of gyroscopes.
Figure 4:
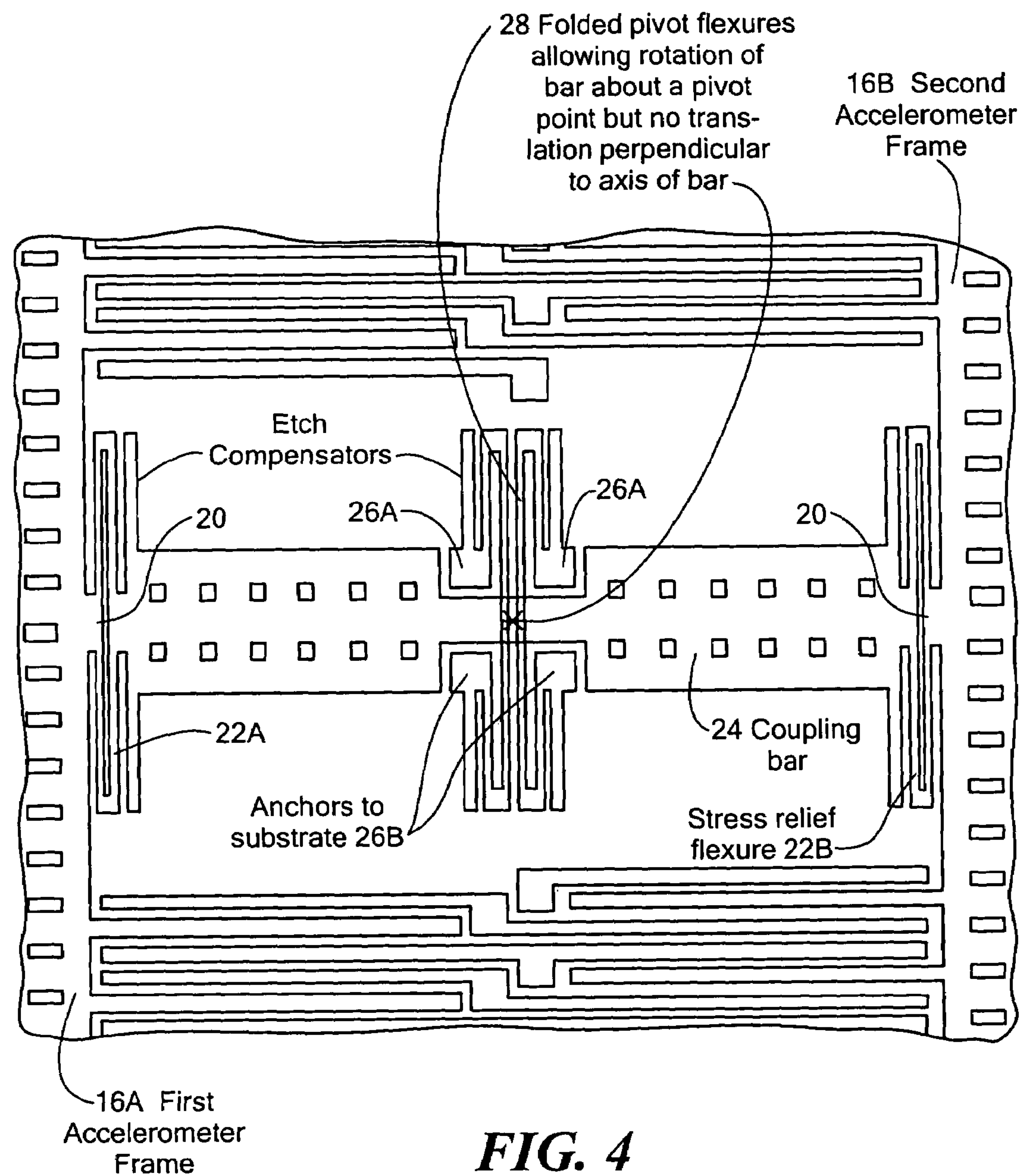
FIG. 4 shows more detail of the specific coupling apparatus used by the gyroscope pair shown in FIG. 3.

FIG. 3 schematically shows additional details of an alternative embodiment of the first pair of frames 16A and 16B. As shown, this embodiment also has the resonator 14, frame 16, coupling apparatus, and other components similar to those discussed above. FIG. 4 shows more detail of the specific coupling apparatus shown in FIG. 3. Note that this coupling apparatus may be used with other gyroscope configurations, including those shown in FIG. 1.

As shown in FIG. 4, the anchor flexure 28 actually extends outwardly and then folds back 180 degrees to meet with the bar 24. In addition, the coupling apparatus also has etch compensators. See the text in FIG. 4, which notes that the folded anchor flexure 28 allows rotation of the bar 24 about a pivot point, but no translation perpendicular to the axis of the bar 24. Also, rather than have a pair of short flexures 20 on each frame, this embodiment uses a single short flexure 20 on each frame.

In addition to ensuring that the frames 16A and 16B move in anti-phase, this flexure arrangement also reduces the potentially adverse effects of material shrinkage and G cross G error. This G cross G error arises when there is in-phase movement of the frames, and this is suppressed or reduced by the couplings.

The coupling apparatus 99 effectively add mass and stiffness to the movements of the frames 16. Since each frame is only coupled to an adjacent frame along one of its sides, the coupling apparatus 99 effectively unbalances the movements of each frame. Therefore, the array 10 preferably includes a number of balancers (referred to herein as "balancers 97A, 97B, 97C, and 97D," respectively, or "balancer 97" generally) to help offset the effects of the coupling apparatus 99. Specifically, a balancer 97 is preferably coupled to a side of each frame opposite the side with the coupling apparatus 99. Thus, balancer 97A is coupled to frame 16A along the side opposite the coupling 99AB, balancer 97B is coupled to frame 16B along the side opposite the coupling 99AB, balancer 97C is coupled to frame 16C along the side opposite the coupling 99CD, and balancer 97D is coupled to frame 16D along the side opposite the coupling 99CD. The configuration of each balancer 97 is typically the equivalent of half of a coupling apparatus 99 and therefore imparts substantially an equal but opposite mechanical effect on its respective frame 16.

Figure 5:
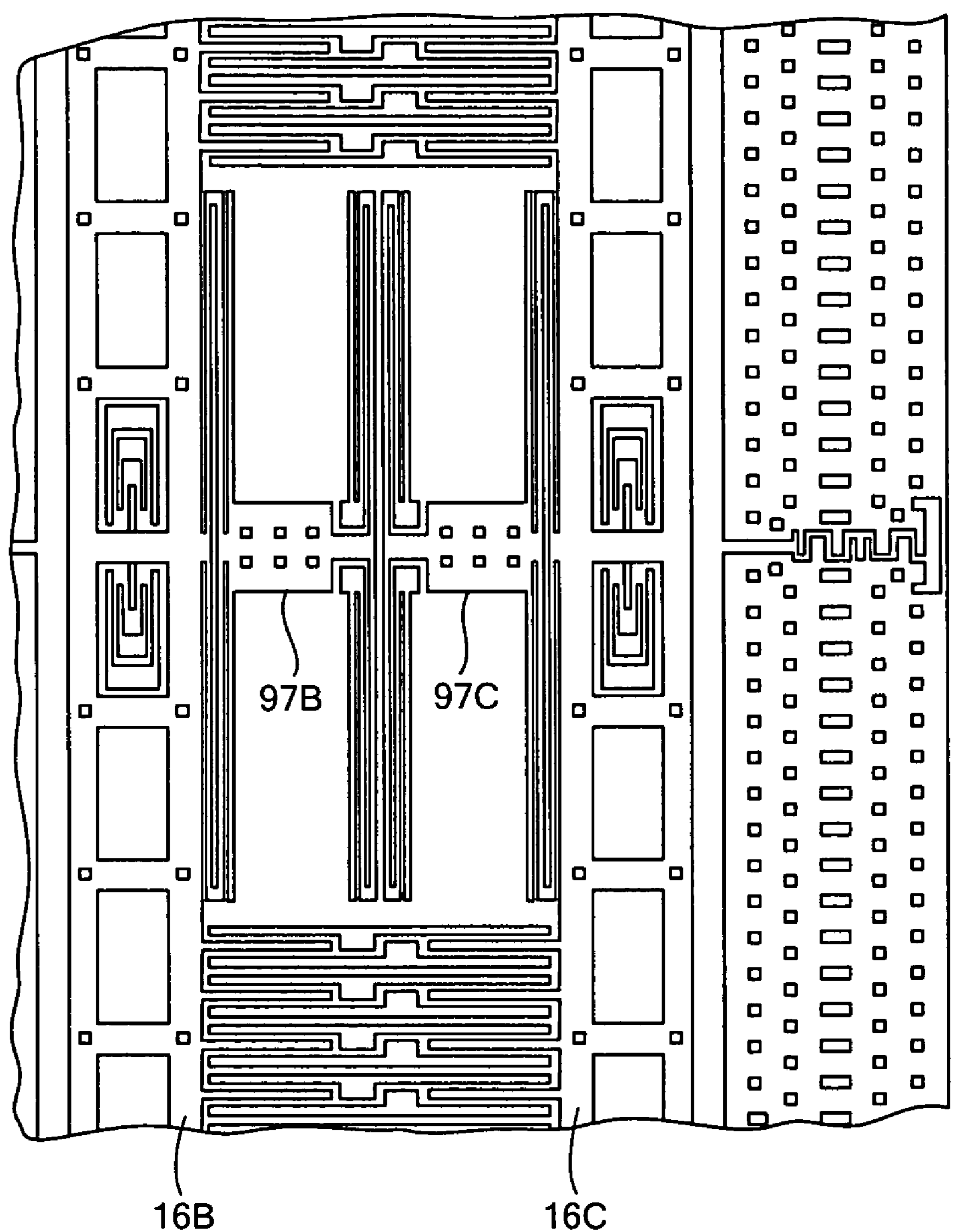
FIG. 5 shows more detail of specific balancers in accordance with illustrative embodiments of the invention.

FIG. 5 shows more detail of specific balancers 97 (in this example, balancers 97B and 97C that sit between the two pairs of sensor elements) in accordance with illustrative embodiments of the invention. As shown, the configuration of each balancer 97 is essentially the equivalent of half of a coupling apparatus as shown in FIG. 4. It should be noted that, unlike the coupling apparatus 99, there is no coupling between the two adjacent balancers 97B and 97C.

In illustrative embodiments, the accelerometers are run at about 17 volts.

The present invention may be embodied in other specific forms without departing from the true scope of the invention. The described embodiments are to be considered in all respects only as illustrative and not restrictive.

What is claimed is:

1. Apparatus for coupling sensor elements of an inertial sensor, the apparatus comprising:

a bar coupled between first and second sensor element frames; and a plurality of anchor flexures supporting the bar above a substrate underlying the frames, each anchor flexure including a structure anchored at one end to the substrate and folded back 180 degrees to meet with the bar, the anchor flexures allowing the bar to rotate at a pivot point when the frames move in anti-phase to one another along separate substantially parallel axes but substantially preventing in-phase movements of the frames, wherein the anchor flexures are anchored adjacent to the bar about the pivot point.

2. Apparatus according to claim 1, further comprising:

a first pair of short flexures extending from one of the frames and interconnected by a first long flexure; and a second pair of short flexures extending from the other of the frames and interconnected by a second long flexure, wherein the bar interconnects the first long flexure to the second long flexure substantially at midpoints of the first and second long flexures.

3. Apparatus according to claim 2, wherein each of the long flexures is coupled so as to flex as the bar rotates.

4. Apparatus according to claim 1, further comprising:

a first flexure extending from one of the frames; and a second flexure extending from the other of the frames, wherein the bar interconnects the first and second flexures.

5. Apparatus according to claim 4, wherein the plurality of anchor flexures includes four anchor flexures positioned around the pivot point.

6. Apparatus according to claim 4, wherein each of the first and second flexures includes two substantially parallel members coupled at both ends, one of the members coupled to the frame, the other member coupled to the bar, the members coupled so as to flex as the bar rotates.

7. Apparatus according to claim 1, wherein rotation of the substrate about an axis normal to the plane causes the movements of the frames.

8. Apparatus for coupling sensor elements of an inertial sensor, the apparatus comprising:

coupling means for coupling first and second sensor element frames; and supporting means for supporting the coupling means above a substrate underlying the frames, the supporting means including a plurality of anchor flexures, each anchor flexure including a structure anchored at one end to the substrate and folded back 180 degrees to meet with the coupling means, the supporting means allowing the coupling means to rotate at a pivot point when the frames move in anti-phase to one another along separate substantially parallel axes but substantially preventing in-phase movements of the frames, wherein the anchor flexures are anchored adjacent to the coupling means about the pivot point.

9. Apparatus according to claim 8, wherein the coupling means comprises:

a first pair of short flexures extending from one of the frames and interconnected by a first long flexure;

a second pair of short flexures extending from the other of the frames and interconnected by a second long flexure; and a bar that interconnects the first long flexure to the second long flexure substantially at midpoints of the first and second long flexures.

10. Apparatus according to claim 9, wherein each of the long flexures is coupled so as to flex as the bar rotates.

11. Apparatus according to claim 8, wherein the coupling means comprises:

a first flexure extending from one of the frames;

a second flexure extending from the other of the frames; and a bar that interconnects the first and second flexures.

12. Apparatus according to claim 8, wherein the supporting means includes four anchor flexures positioned around the pivot point.

13. Apparatus according to claim 11, wherein each of the first and second flexures includes two substantially parallel members coupled at both ends, one of the members coupled to the frame, the other member coupled to the bar, the members coupled so as to flex as the bar rotates.

14. Apparatus according to claim 8, wherein rotation of the substrate about an axis normal to the plane causes the movements of the frames.

15. Apparatus according to claim 1, further comprising:

a plurality of balancers coupled to the frames such that each frame includes a balancer coupled on a side opposite to the bar.

16. Apparatus according to claim 8, further comprising:

balancing means coupled to the frames opposite the coupling means.

* * * * *